(12) United States Patent
Bae

(10) Patent No.: US 8,416,194 B2
(45) Date of Patent: Apr. 9, 2013

(54) APPARATUS AND METHOD FOR ADJUSTING A KEY RANGE OF A KEYCAPLESS KEYBOARD

(75) Inventor: Seung-Min Bae, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 561 days.

(21) Appl. No.: 12/549,599

(22) Filed: Aug. 28, 2009

(65) Prior Publication Data

US 2010/0053088 A1    Mar. 4, 2010

(30) Foreign Application Priority Data

Aug. 29, 2008 (KR) .................. 10-2008-0084921

(51) Int. Cl.
G06F 3/02 (2006.01)
G06F 3/041 (2006.01)

(52) U.S. Cl. ........................... 345/168; 345/173

(58) Field of Classification Search .............. None
See application file for complete search history.

(56) References Cited

U.S. PATENT DOCUMENTS

| | | | |
|---|---|---|---|
| 2004/0009788 A1* | 1/2004 | Mantyjarvi et al. | 455/550.1 |
| 2005/0206730 A1* | 9/2005 | Hagiwara | 348/169 |
| 2010/0079310 A1* | 4/2010 | Nachman et al. | 341/23 |

FOREIGN PATENT DOCUMENTS

| | | |
|---|---|---|
| JP | 2003280782 A | 10/2003 |
| JP | 2006-031518 A | 2/2006 |
| KR | 10-2008-0024381 A | 3/2008 |

* cited by examiner

Primary Examiner — Hoa T Nguyen
Assistant Examiner — Mark Fischer
(74) Attorney, Agent, or Firm — Jefferson IP Law, LLP

(57) ABSTRACT

An apparatus and method for adjusting a key range of a keycapless keyboard are provided. The apparatus includes a keyboard, a controller, and a manager. The keyboard is comprised of a touch screen. The controller determines whether revision of a user's input value through the keyboard has occurred. The manager adjusts a key range to avoid a user's input error if revisions with a same pattern have occurred as many times as a predefined number.

10 Claims, 4 Drawing Sheets

APPARATUS AND METHOD FOR ADJUSTING A KEY RANGE OF A KEYCAPLESS KEYBOARD

PRIORITY

The present application claims the benefit under 35 U.S.C. §119(a) of a Korean patent application filed in the Korean Intellectual Property Office on Aug. 29, 2008 and assigned Serial No. 10-2008-0084921, the entire disclosure of which is hereby incorporated by reference.

BACKGROUND OF THE INVENTION

1. Field of the Invention

The present invention relates to an equipment using a keycapless keyboard. More particularly, the present invention relates to an apparatus and method for adjusting a key range in an equipment using a keycapless keyboard.

2. Description of the Related Art

A keyboard represents an input device of a form such as a typewriter including Hangeul, alphabetic letter, numeric digit, specific character, and function keys. In general, the keyboard is used in conjunction with computing equipment as one of several input devices. The keyboard is divided into an electronic type and a mechanical type depending on a working principle. In the case of an electronic keyboard, a spring within a key is compressed by a key press, which causes an amount of electrical charge flowing in a circuit to be reduced. A circuit connected below the key measures an amount of electrical charge and detects one of a press and a non-press of the key. In the case of a mechanical keyboard, two electrical contacts below a key contact due to a key press, thereby causing electric current to flow. A circuit connected below the key detects the one of the press and the non-press of the key depending on one of a flow and non-flow of electric current.

With the development of an input device following the progress of technology, an input scheme of a form referred to as a touch screen has been developed. The touch screen functions as an input device by attaching a touch pad to a display unit. For example, a touch may be detected based on a user's fingertip or other object contacting with a screen through infrared rays radiated through the screen. Alternatively, the touch may be detected when the user's fingertip or other object contacts the screen based on a change of capacitance or resistance resulting from the contact. Accordingly, it is being taken into consideration to apply the touch screen technology to a keyboard. This is referred to as a touch screen keyboard or a keycapless keyboard.

By applying touch screen technology to a keyboard, a key of a physical form can be excluded. Due to this, problems of a physical separation of a key, contamination of the key, etc. are fundamentally solved. Further, shapes and positions of keys are not physically fixed and thus, there is a high degree of freedom for construction of the keys. By using this characteristic, shapes of keys constituting a keycapless keyboard can be suitably adjusted to a characteristic of a user. Accordingly, a scheme for suitably adjusting shapes of keys to a characteristic of a user has to be suggested.

SUMMARY OF THE INVENTION

An aspect of the present invention is to address at least the above-mentioned problems and/or disadvantages and to provide at least the advantages described below. Accordingly, an aspect of the present invention is to provide an apparatus and method for adjusting shapes of keys suitably to a characteristic of a user in an equipment using a keycapless keyboard.

Another aspect of the present invention is to provide an apparatus and method for adjusting a key range depending on user's erroneous input in an equipment using a keycapless keyboard.

A further aspect of the present invention is to provide an apparatus and method for determining one of adjustment and non-adjustment of a key range depending on a user's revision history in an equipment using a keycapless keyboard.

Yet another aspect of the present invention is to provide an apparatus and method for determining a user's input error depending on an occurrence of user's input value revision in an equipment using a keycapless keyboard.

Still another aspect of the present invention is to provide an apparatus and method for determining a key range adjustment scheme depending on a user's input error pattern in an equipment using a keycapless keyboard.

Still another aspect of the present invention is to provide an apparatus and method for at least one of extending and reducing a key range, and for shifting a position depending on a user's input error pattern in an equipment using a keycapless keyboard.

The above aspects are addressed by providing an apparatus and method for adjusting a key range of a keycapless keyboard.

In accordance with an aspect of the present invention, an equipment apparatus using a keycapless keyboard is provided. The apparatus includes a keyboard comprised of a touch screen, a controller for determining whether revision of a user's input value through the keyboard has occurred, and a manager for adjusting a key range to avoid a user's input error when revisions with a same pattern have occurred as many times as a predefined number.

In accordance with another aspect of the present invention, a key range revision method of an equipment using a keycapless keyboard is provided. The method includes determining whether revision of a user's input value through a keyboard that is comprised of a touch screen has occurred, determining whether revisions with a same pattern have occurred as many times as a predefined number, and adjusting a key range to avoid a user's input error.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1A:
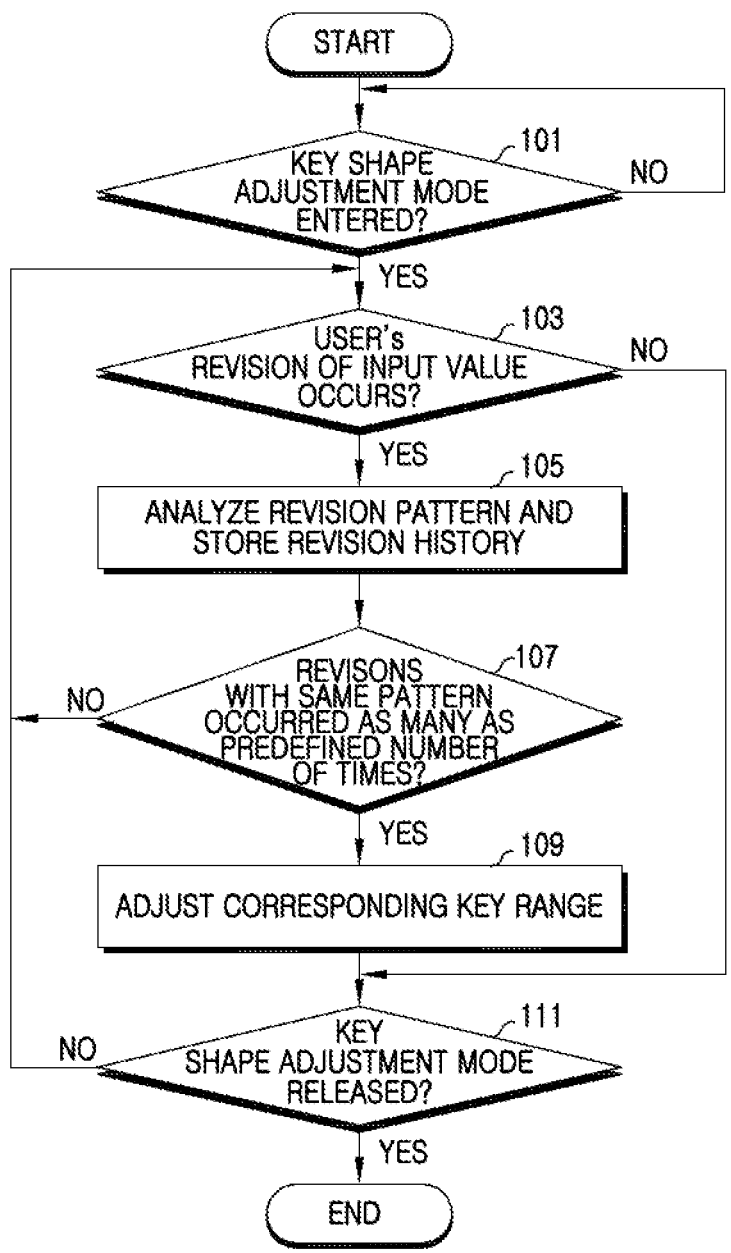
FIGS. 1A to 1C are flowcharts illustrating a key range revision procedure in an equipment using a keycapless keyboard according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

A technology for suitably adjusting shapes of keys to a characteristic of a user in an equipment using a keycapless keyboard, according to exemplary embodiments of the present invention, is described below. The exemplary embodiments of the present invention below are applicable to a desktop computer and laptop computer using a keyboard as an input device, and all computing equipment that is able to selectively use a keyboard.

A basis of a scheme suggested in exemplary embodiments of the present invention to suitably adjust shapes of keys to a characteristic of a user in an equipment using a keycapless keyboard is described below. When a user uses a keycapless keyboard, if a key shape is not suitable, erroneous input may occur. Accordingly, the user may have to revise an erroneously input value. Thus, if a frequency of occurrence of the same erroneous input is high, the need for revision of that same erroneous input will correspondingly be high. That is, for the same erroneous input, the rate at which revision is needed corresponds to a frequency of occurrence of an erroneous input. For example, if user's revision to revise 'a' to 'z' often occurs, it indicates that a frequency of occurrence of an event that a user erroneously inputs 'a' instead of 'z' is high. In addition, a frequency of occurrence of an erroneous input of the same pattern that is high indicates that shapes of keys related to the pattern are not proper for a user. Thus, an equipment using a keycapless keyboard according to exemplary embodiments of the present invention provides a key shape that is suitable to a characteristic of a user, by adjusting shapes of keys related to a specific pattern depending on an occurrence of a frequent revision for the specific pattern.

In more detail, adjustment of a key shape is accomplished through key range extension, key range reduction, or key range shift. The key range extension is performed if an omission of key input is detected, the key range reduction is performed if a plurality of keys are simultaneously input, and the key range shift is performed if an erroneous input of an adjacent key is detected. Accordingly, if revision of an input value by a user occurs, an equipment using a keycapless keyboard according to exemplary embodiments of the present invention determines whether it corresponds to any case among the cases, and performs a key range adjustment operation corresponding to the identified case.

In exemplary embodiments of the present invention, operation procedure and construction of an equipment using a keycapless keyboard for adjusting a key shape according to the aforementioned scheme are described below in detail with reference to the accompanying drawings.

FIG. 1A illustrates a key range revision procedure in an equipment using a keycapless keyboard according to an exemplary embodiment of the present invention.

Referring to FIG. 1A, in step 101, the equipment using the keycapless keyboard determines whether the equipment enters a key shape adjustment mode. Here, the key shape adjustment mode is a mode of performing an operation for adjusting shapes of keys to be adapted to a characteristic of a user, and is entered based on one of an instruction of a user and when a specific condition is met. However, according to another exemplary embodiment of the present invention, the equipment using the keycapless keyboard may continuously perform an operation for adjusting a key shape without the definition of a special mode such as the key shape adjustment mode. In this case, step 101 is omitted.

If the key shape adjustment mode has been entered, the equipment using the keycapless keyboard proceeds to step 103 and determines whether revision of a user's input value occurs. That is, the equipment using the keycapless keyboard determines whether, in the course of input through the keycapless keyboard, at least one of an input value deletion and a new value input occurs.

If the revision of the input value occurs, the equipment using the keycapless keyboard proceeds to step 105 and, after analyzing a revision pattern, stores a revision history. That is, the equipment using the keycapless keyboard analyzes if the revision of the user's input value occurs due to any of an omission of a key input, simultaneous input of a plurality of keys, and an erroneous input of an adjacent key. The equipment then stores a revision history based on a pattern.

The equipment using the keycapless keyboard then proceeds to step 107 and determines whether revisions with a same pattern occur as many times as a predefined number. That is, the equipment using the keycapless keyboard searches the stored history of the revision pattern, identifies how many revisions with the same pattern occurred, and determines whether the identified number of times is equal to the predefined number. Here, the predefined number is a value determined by a setting of the equipment, and has an integer value of '1' or more. If the revisions with the same pattern have not occurred as many times as the predefined number, the equipment using the keycapless keyboard proceeds to step 111.

On the other hand, if the revisions with the same pattern have occurred as many times as the predefined number, the equipment using the keycapless keyboard proceeds to step 109 and adjusts a corresponding key range. For example, the equipment using the keycapless keyboard at least one of extends a key range, reduces the key range, and shifts a position of the key range. That is, the equipment using the keycapless keyboard adjusts a key range to avoid an input error corresponding to an analyzed revision pattern. A detailed operation process of steps 105 to 109 is described below in detail with reference to FIGS. 1B and 1C.

The equipment using the keycapless keyboard then proceeds to step 111 and determines whether a key shape adjustment mode is released. The key shape adjustment mode is released based on one of an instruction from the user and a specific condition being met. However, according to another exemplary embodiment of the present invention, the equipment using the keycapless keyboard may perform an operation for continuously adjusting a key shape without the definition of a special mode such as the key shape adjustment mode. In this case, step 111 is omitted. If the key shape adjustment mode is not released, the equipment using the keycapless keyboard returns to step 103 and, if the key shape adjustment mode is released, the equipment using the keycapless keyboard terminates the procedure according to an exemplary embodiment of the present invention.

Figure 1B:
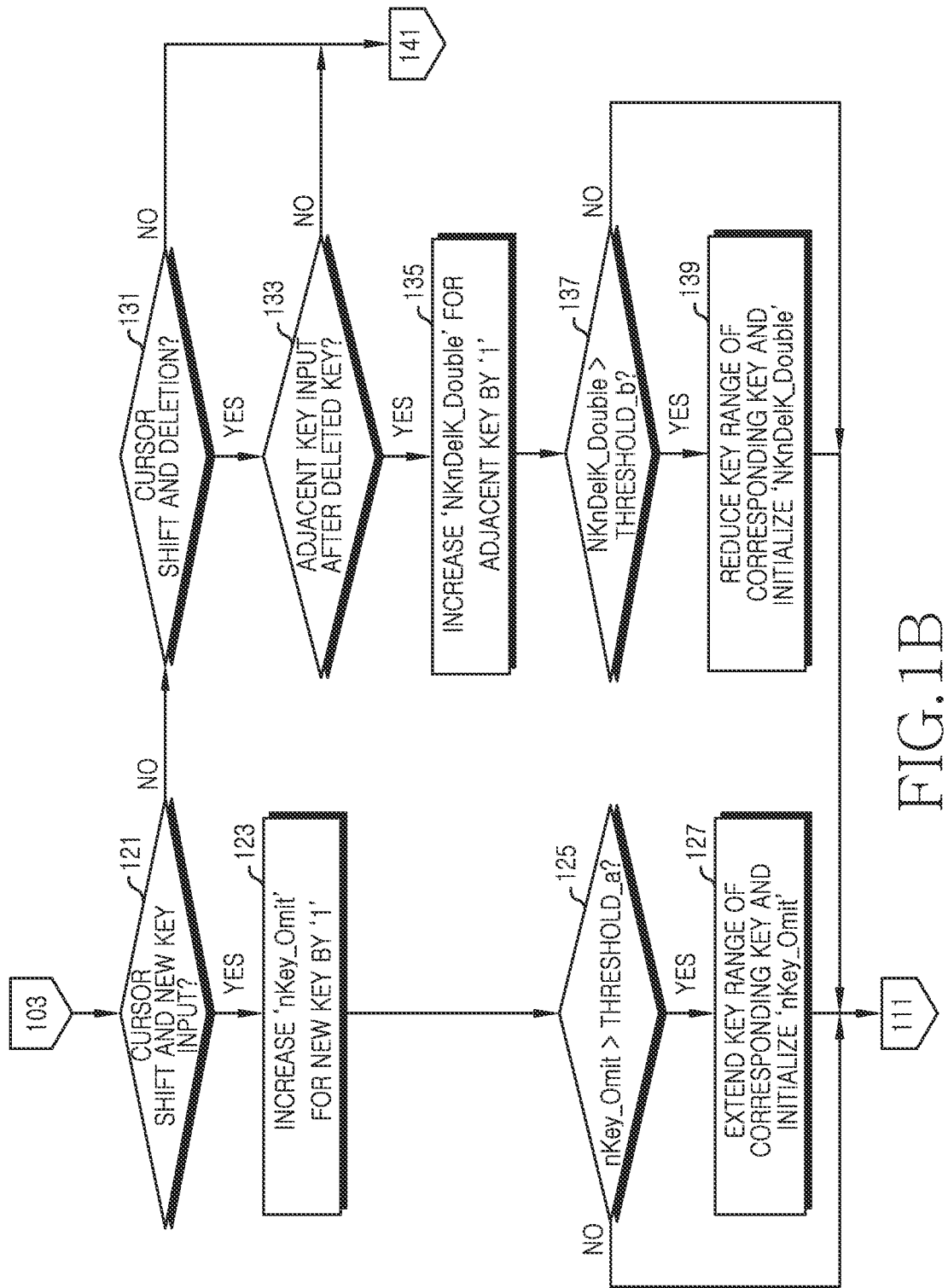
Figure 1C:
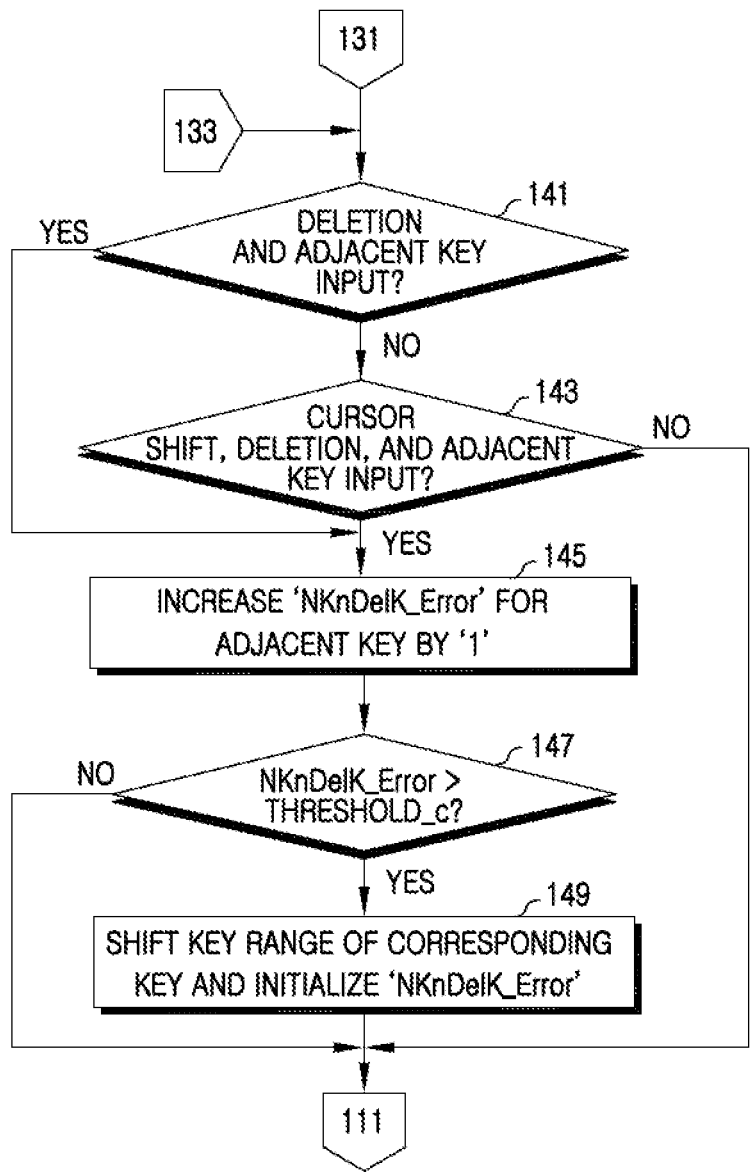

FIGS. 1B and 1C illustrate a revision pattern analysis and a key range adjustment procedure in an equipment using a keycapless keyboard according to an exemplary embodiment of the present invention. According to an exemplary embodiment of the present invention illustrated in FIGS. 1B and 1C, the equipment using the keycapless keyboard uses a counter variable corresponding to each case to store a history of each occurrence of omission of key input, occurrence of simultaneous input of a plurality of keys, and occurrence of erroneous input of an adjacent key. Here, a variable for counting the omission of the key input is expressed by 'nKey_Omit (new Key Omit)', a variable for counting of the simultaneous input of the plurality of keys is expressed by 'NKnDelK_Double (Neighbor Key and Deleted Key Double)', and a variable for counting of the erroneous input to the adjacent key is expressed by 'NKnDelK_Error (Neighbor Key and Deleted Key Error)'.

Referring to FIG. 1B, the equipment using the keycapless keyboard proceeds to step 121 and determines whether a cursor shift and new key input have occurred. That is, the equipment using the keycapless keyboard determines whether a new key is additionally input without deletion of an input key. That is, the equipment using the keycapless keyboard determines whether omission of key input has occurred.

If a cursor shift and new key input have occurred, the equipment using the keycapless keyboard determines that omission of key input has occurred and proceeds to step 123 to increase the 'nKey_Omit' for the new key by '1'.

After increasing the 'nKey_Omit' for the new key by '1', the equipment using the keycapless keyboard proceeds to step 125 and determines whether the 'nKey_Omit' for the new key exceeds a threshold_a. In other words, the equipment using the keycapless keyboard determines whether the key input omission for the new key has occurred as many times as the predefined number.

If the 'nKey_Omit' for the new key exceeds the threshold_a, the equipment using the keycapless keyboard proceeds to step 127 and extends a key range of a corresponding key, i.e., the new key. The equipment using the keycapless keyboard initializes the 'nKey_Omit' of the new key to '0'.

If the cursor shift and new key input have not occurred in step 121, the equipment using the keycapless keyboard proceeds to step 131 and determines whether a cursor shift and deletion have occurred. In other words, the equipment using the keycapless keyboard determines whether an input key is deleted without input of a new key. Here, the deletion may include deletion using a 'del' key and deletion using a 'backspace'.

If the cursor shift and deletion have occurred, the equipment using the keycapless keyboard proceeds to step 133 and determines whether an adjacent key is input after the deleted key. For example, if a key 'a' and a key 's' are adjacent, and the 's' is deleted, the equipment using the keycapless keyboard determines whether the 'a' that has been input corresponds to a key that is to a left side or right side of a position of the key corresponding to the deleted 's'.

If there is an adjacent key input after the deleted key, the equipment using the keycapless keyboard determines that a simultaneous input of the plurality of keys has occurred and proceeds to step 135 to increase the 'NKnDelK_Double' for the adjacent key by '1'.

After increasing the 'NKnDelK_Double' for the adjacent key by '1', the equipment using the keycapless keyboard proceeds to step 137 and determines whether the 'NKnDelK_Double' for the adjacent key exceeds a threshold_b. In other words, the equipment using the keycapless keyboard determines whether simultaneous input of the adjacent key with a different key has occurred as many times as the predefined number.

If the 'NKnDelK_Double' for the adjacent key exceeds the threshold_b, the equipment using the keycapless keyboard proceeds to step 139 and reduces a key range of a corresponding key, i.e., the adjacent key. The equipment using the keycapless keyboard initializes the 'NKnDelK_Double' of the adjacent key to '0'.

If the cursor shift and the deletion have not occurred in step 131, the equipment using the keycapless keyboard proceeds to step 141 and determines whether a deletion and adjacent key input have occurred. In other words, the equipment using the keycapless keyboard determines whether an input key has been deleted, and input of a key adjacent to the deleted key has occurred. That is, the equipment using the keycapless keyboard determines whether erroneous input to the adjacent key has occurred.

If the deletion and adjacent key input have not occurred, the equipment using the keycapless keyboard proceeds to step 143 and determines whether cursor shift, deletion, and adjacent key input have occurred. In other words, the equipment using the keycapless keyboard determines whether, after a cursor is shifted, an input key is deleted, and input of a key adjacent to the deleted key has occurred. That is, the equipment using the keycapless keyboard determines whether erroneous input to the adjacent key has occurred.

If it is identified that the deletion and adjacent key input have occurred in step 141 or it is identified that the cursor shift, deletion, and adjacent key input have occurred in step 143, the equipment using the keycapless keyboard determines that erroneous input to the adjacent key has occurred and proceeds to step 145 to increase 'NKnDelK_Error' for the adjacent key by '1'.

After increasing the 'NKnDelK_Error' for the adjacent key by '1', the equipment using the keycapless keyboard proceeds to step 147 and determines whether the 'NKnDelK_Error' for the adjacent key exceeds a threshold_c. In other words, the equipment using the keycapless keyboard determines whether erroneous input to the adjacent key has occurred as many times as the predefined number.

If the 'NKnDelK_Error' for the adjacent key exceeds the threshold_c, the equipment using the keycapless keyboard proceeds to step 149 and shifts a key range of a corresponding key, i.e., the adjacent key. At this time, the key range of the adjacent key may be shifted in a direction opposite to a direction of the deleted key. The equipment using the keycapless keyboard initializes the 'NKnDelK_Error' of the adjacent key to '0'.

Figure 2:
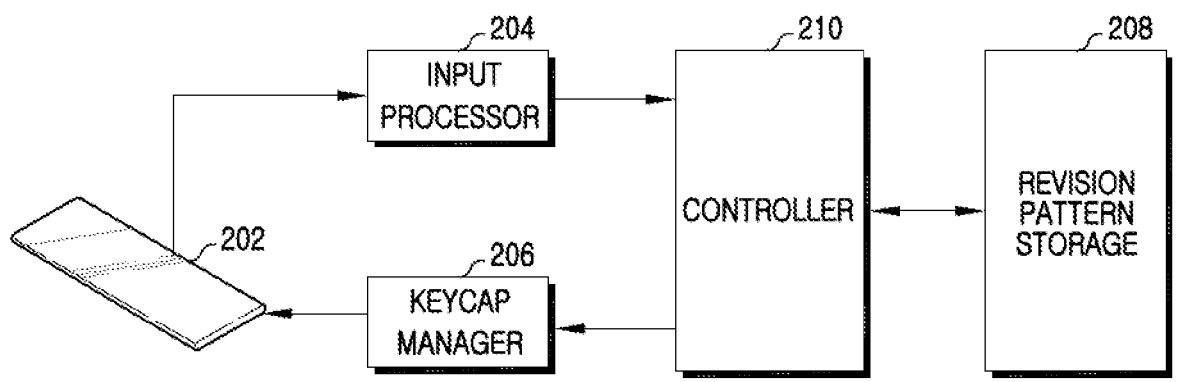
FIG. 2 is a block diagram illustrating a construction of an equipment using a keycapless keyboard according to an exemplary embodiment of the present invention.

FIG. 2 is a block diagram illustrating a construction of an equipment using a keycapless keyboard according to an exemplary embodiment of the present invention.

As illustrated in FIG. 2, the equipment using the keycapless keyboard includes a keyboard 202, an input processor 204, a keycap manager 206, a revision pattern storage 208, and a controller 210.

The keyboard 202, which is a keycapless keyboard, comprises a touch screen. The keyboard 202 detects a position where a user's input occurs, and informs the input processor 204 of the identified position. For example, the keyboard 202 detects that the user's fingertip or another object contacts a screen using infrared rays radiated through the screen. Alternatively, the keyboard 202 may detect that the user's fingertip or other object contacts the screen based on a change of capacitance or resistance resulting from the contact. The input processor 204 generates a data value corresponding to user's input through the keyboard 202, and provides the generated data value to the controller 210.

The keycap manager 206 constructs a picture representing shapes of keys on the screen of the keyboard 202. That is, the keycap manager 206 provides shapes of keys, i.e., an image representing a virtual keycap to the keyboard 202. More particularly, the keycap manager 206 adjusts a range of a specific key according to an instruction from the controller 210. That is, if adjustment of a key range according to erroneous input is instructed from the controller 210, the keycap manager 206 performs at least one of extending a boundary of the key range, reducing the boundary of the key range, and shifting a position of the key range. At this time, a detailed scheme of adjustment of a key range is determined by a touch position when an erroneous input has occurred, etc. That is, the keycap manager 206 analyzes a user's input disposition, etc, and adjusts a key range to avoid an input error.

The revision pattern storage 208 analyzes a revision pattern when revision of the user's input value occurs and then, stores a revision history by pattern. Here, the revision pattern is one of omission of key input, simultaneous input of a plurality of keys, and erroneous input of an adjacent key. Thus, the revision pattern storage 208 analyzes if the revision of the user's input value has occurred due to any case among the omission of the key input, the simultaneous input of the plurality of keys, and the erroneous input of the adjacent key and then, stores a revision history based on a pattern. In more detail, if a cursor shift and new key input have occurred, the revision pattern storage 208 determines that the omission of the key input has occurred, and increases 'nKey_Omit' for the new key by '1'. Alternatively, if a cursor shift and deletion have occurred and an adjacent key was input after the deleted key, the revision pattern storage 208 determines that the simultaneous input of the plurality of keys has occurred, and increases 'NKnDelK_Double' for the adjacent key by '1'. Alternately, if the deletion and adjacent key input have occurred, or the cursor shift, deletion, and adjacent key input have occurred, the revision pattern storage 208 determines that the erroneous input of the adjacent key has occurred, and increases 'NKnDelK_Error' for the adjacent key by '1'.

The controller 210 controls general operations of the equipment using the keycapless keyboard. More particularly, according to an exemplary embodiment of the present invention, the controller 210 controls a function for adjusting a key range according to a revision of a user's input value. That is, a key shape adjustment mode is entered, the controller 210 monitors for the occurrence of a revision of the user's input value. That is, the controller 210 determines whether it deletes an input value and inputs a new value in the course of an input through the keyboard 202. If the revision of the input value is determined to have occurred, the controller 210 provides the revision pattern storage 208 with information on the revision of the input value, i.e., information on keys input in an input value revision process. The controller 210 determines whether revisions with a same pattern have occurred as many times as the predefined number. In other words, the controller 210 identifies the number of revisions with the same pattern, and determines whether the identified number of revisions is equal to the predefined number, by searching a history of a revision pattern stored in the revision pattern storage 208. Here, the predefined number, which is a value determined by a setting of the equipment, has an integer value of '1' or more. If the revisions with the same pattern have occurred as many times as the predefined number, the controller 210 controls the keycap manager 206 to adjust a key range corresponding to a deleted value or a newly input value.

In more detail, if an 'nKey_Omit' for a specific key exceeds a threshold_a, the controller 210 controls the keycap manager 206 to extend a key range of the specific key, and controls the revision pattern storage 208 to initialize the 'nKey_Omit' of the specific key to '0'. Alternatively, if an 'NKnDelK_Double' for a specific key exceeds a threshold_b, the controller 210 controls the keycap manager 206 to reduce a key range of the specific key, and controls the revision pattern storage 208 to initialize the 'NKnDelK_Double' of the specific key to '0'. Alternately, if an 'NKnDelK_Error' for a specific key exceeds a threshold_c, the controller 210 controls the keycap manager 206 to shift a key range of the specific key, and controls the revision pattern storage 208 to initialize the 'NKnDelK_Error' of the specific key to '0'.

Here, the key shape adjustment mode is a mode of performing an operation for adjusting shapes of keys to be adapted to a characteristic of a user, and is entered based on one of an instruction from a user and a specific condition being met. However, according to another exemplary embodiment of the present invention, the controller 210 can continuously perform an operation for adjusting a key shape without the definition of a special mode such as the key shape adjustment mode.

Exemplary embodiments of the present invention can provide a key shape adapted to a characteristic of a user, by adjusting a key range according to a user's input error in an equipment using a keycapless keyboard.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An equipment apparatus using a keycapless keyboard, the apparatus comprising:
    a keyboard comprised of a touch screen;
    a controller for determining whether revision of a user's input value through the keyboard has occurred; and
    a manager for adjusting a key range to avoid a user's input error when revisions with a same pattern have occurred as many times as a corresponding predefined number,
    wherein the manager is configured to reduce a key range of a key that was intended to be input when a simultaneous input of a plurality of keys occurred as many times as a first predefined number.

2. The apparatus of claim 1, wherein the manager performs at least one of extending the key range, reducing the key range, and shifting a position of the key range.

3. The apparatus of claim 2, wherein the revision is determined among revision patterns including an omission of key input, a simultaneous input of a plurality of keys, and an erroneous input of an adjacent key.

4. The apparatus of claim 3, wherein the manager is configured to extend a key range of a key that was omitted when the omission of the key input occurred as many times as a second predefined number, and wherein the manager is configured to shift a key range of a key that was intended to be input when the erroneous input of the adjacent key occurred as many times as a third predefined number.

5. The apparatus of claim 4, further comprising a revision pattern storage configured to:

determine that the omission of the key input occurred when revision of the user's input value includes a cursor shift and new key input, determine that the simultaneous input of the plurality of keys occurred when revision of the user's input value includes a cursor shift and deletion of an adjacent key without an input of an adjacent key after deletion, and determine that the erroneous input to the adjacent key occurred when revision of the user's input value includes a deletion and adjacent key input, or cursor shift, deletion, and adjacent key input occurred.

6. A key range revision method of an equipment using a keycapless keyboard, the method comprising:

determining whether revision of a user's input value through a keyboard that is comprised of a touch screen has occurred;

determining whether revisions with a same pattern have occurred as many times as a corresponding predefined number; and adjusting a key range to avoid a user's input error, wherein adjusting of the key range comprises if a simultaneous input of a plurality of keys occurred as many times as a first predefined number, reducing a key range of a key that was intended to be input.

7. The method of claim 6, wherein adjusting of the key range comprises performing at least one of extending the key range, reducing the key range, and shifting a position of the key range.

8. The method of claim 7, wherein the revision is determined among revision patterns including an omission of key input, a simultaneous input of a plurality of keys, and an erroneous input of an adjacent key.

9. The method of claim 8, wherein adjusting of the key range further comprises:

if the omission of the key input occurred as many times as a second predefined number, extending an omitted key range; and if the erroneous input to the adjacent key occurred as many times as a third predefined number, shifting a key range of a key that was intended to be input.

10. The method of claim 9, further comprising:

when revision of the user's input value includes a cursor shift and new key input, determining that the omission of the key input occurred;

when revision of the user's input value includes a cursor shift and deletion of an adjacent key without an input of an adjacent key after deletion, determining that the simultaneous input of the plurality of keys occurred; and when revision of the user's input value includes a deletion and adjacent key input, or cursor shift, deletion, and adjacent key input occurred, determining that the erroneous input to the adjacent key occurred.

* * * * *